US008909385B2

(12) United States Patent  (10) Patent No.: US 8,909,385 B2
Olson et al.  (45) Date of Patent: Dec. 9, 2014

(54) INFRARED SIGNATURE MATCHING SYSTEM, CONTROL CIRCUIT, AND RELATED METHOD

(75) Inventors: Jared K. Olson, North Ogden, UT (US); James Child, Riverton, UT (US); Roger Jackson, Salt Lake City, UT (US); Jared S. Teter, Saratoga Springs, UT (US); Evan Crocker, Logan, UT (US)

(73) Assignee: Alliant Techsystems Inc., Arlington, VA (US)

( * ) Notice: Subject to any disclaimer, the term of this patent is extended or adjusted under 35 U.S.C. 154(b) by 662 days.

(21) Appl. No.: 13/007,463

(22) Filed: Jan. 14, 2011

(65) Prior Publication Data

US 2012/0185109 A1   Jul. 19, 2012

(51) Int. Cl.
*G05D 23/00* (2006.01)
*G05D 23/27* (2006.01)
*F41H 3/00* (2006.01)

(52) U.S. Cl.
CPC ............. *G05D 23/2723* (2013.01); *F41H 3/00* (2013.01)
USPC ............................. 700/300; 342/12; 342/14

(58) Field of Classification Search
CPC ..................................................... G05D 23/00
USPC ...................................... 700/300; 342/12, 14
See application file for complete search history.

(56) References Cited

U.S. PATENT DOCUMENTS

| | | | |
|---|---|---|---|
| 4,560,595 A | 12/1985 | Johansson | |
| 5,077,101 A | 12/1991 | Conway et al. | |
| 5,080,165 A | 1/1992 | Engelhardt | |
| 5,270,550 A * | 12/1993 | Martorana et al. | 250/505.1 |
| 5,307,162 A | 4/1994 | Schowengerdt | |
| 5,734,495 A | 3/1998 | Friedman | |
| 6,338,292 B1 | 1/2002 | Reynolds et al. | |
| 6,561,072 B1 | 5/2003 | Laine et al. | |
| 6,619,180 B1 | 9/2003 | Hoover et al. | |
| 6,790,526 B2 | 9/2004 | Vargo et al. | |
| 6,927,724 B2 | 8/2005 | Snaper | |
| 7,102,814 B1 | 9/2006 | Hughes | |

(Continued)

FOREIGN PATENT DOCUMENTS

| DE | 3614016 A1 | 10/1987 |
|---|---|---|
| DE | 20314484 U1 | 3/2005 |

(Continued)

OTHER PUBLICATIONS

Disheng, Wei, et al., Application of Composite Materials in Infrared Camouflage, Acta Aeronautica Et Astronautica Sinica, Dec. 2009, pp. 2462-2468, vol. 30, No. 12, abstract 3 pages.

*Primary Examiner* — Tejal Gami
(74) *Attorney, Agent, or Firm* — TraskBritt

(57) ABSTRACT

An infrared (IR) signature matching system comprises a heating and cooling device, a plurality of sensors configured to detect information related to the IR signature of the heating and cooling device and a background environment, a controller operably coupled with the heating and cooling device and the plurality of sensors. The controller is configured to receive the information from the plurality of sensors and adjust the temperature of the heating and cooling device until the IR signature of the heating and cooling device and the IR signature of the background environment are at least substantially matched in a selectable sub-region of the IR spectrum. Other systems, control circuits and related methods for matching IR signatures and cloaking objects in the IR spectrum are disclosed herein.

20 Claims, 7 Drawing Sheets

(56) References Cited

U.S. PATENT DOCUMENTS

| | | |
|---|---|---|
| 7,215,275 B2 | 5/2007 | Dumas |
| 2004/0119631 A1* | 6/2004 | Sanders et al. ................... 342/14 |
| 2004/0213982 A1 | 10/2004 | Touzov |
| 2005/0045702 A1 | 3/2005 | Freeman et al. |
| 2005/0208321 A1* | 9/2005 | Riley et al. ..................... 428/593 |
| 2008/0143579 A1* | 6/2008 | Saccomanno ................... 342/12 |
| 2010/0000231 A1 | 1/2010 | Meier |

FOREIGN PATENT DOCUMENTS

| | | |
|---|---|---|
| DE | 4210415 A1 | 2/2009 |
| FR | 2823561 A1 | 10/2002 |
| FR | 2827669 A2 | 1/2003 |
| JP | 7-120197 A | 5/1995 |
| JP | 2009-41142 A | 2/2009 |
| WO | 2006/096181 A1 | 9/2006 |
| WO | 2009/040823 A2 | 4/2009 |

* cited by examiner

INFRARED SIGNATURE MATCHING SYSTEM, CONTROL CIRCUIT, AND RELATED METHOD

TECHNICAL FIELD

Embodiments of the present disclosure relate to infrared imaging and, more specifically, to a system, a control circuit, and a method related to matching infrared (IR) signatures of an object with an IR signature of a background environment.

BACKGROUND

IR imaging equipment (e.g., IR cameras) may be employed to capture information regarding IR emissions in the electromagnetic (EM) spectrum for environments of interest (EOI), and to make observations about objects of interest (OOI) or targets of interest (TOI) within those environments. An object (e.g., OOI, TOI, etc.) may be distinguished from its environment (i.e., background) by observing differences in the IR emissions between the object and its background (e.g., objects, materials, etc.). Because IR emissions are at least partially related to temperature of an object, the IR imaging equipment can indirectly measure the thermal profile of an object by detecting IR emissions within the field of view of the IR imaging equipment.

There are situations in which it may be desirable to cloak the detection of the IR emissions of an object, such as during combat. For example, passive infrared (PIR) devices may be used to detect IR emissions, and may be further configured to trigger improvised explosive devices (IEDs) when a difference in temperature is detected from the background temperature, such as, for example, when a hot engine of a vehicle travels down the road. Military vehicles such as high mobility multipurpose wheeled vehicles (HMMWV), armored vehicles (e.g., Buffalo), and other similar vehicles may have their IR signatures masked (i.e., matched to the IR signature of the background), which may protect the vehicle from detection by IR imaging equipment. The temperature of the vehicle may be adjusted in order to mask the IR signature of the engine for a period of time long enough to drive through choke point suspected to be secured with PIR devices and IEDs. Another combat situation involves weapons systems that use IR detection as a seeking method or for terminal guidance to "look" for TOIs, which have IR emissions that are different from the background. In order to hide the TOI from such weapons systems, the IR signature of the TOI, or an object placed in front of the TOI, may be matched with the IR signature of the background.

Conventional methods for cloaking an object in the IR spectrum include matching the reflectivity of an object. Matching reflectivity of an object may be desirable for situations in which the user of IR imaging equipment relies on an outside IR source to illuminate the objects for detection; however, not all IR imaging equipment relies on outside IR sources to illuminate the objects for detection. Other conventional methods may match the IR emissions over a fixed wavelength range of the IR spectrum. The inventors have appreciated that there is a need for improved methods for cloaking objects from detection within the IR spectrum.

BRIEF SUMMARY

In some embodiments, an IR signature matching system is disclosed. The IR signature matching system comprises a heating and cooling device, a plurality of sensors configured to detect information related to the IR signature of the heating and cooling device and a background environment, and a controller operably coupled with the heating and cooling device and the plurality of sensors. The controller is configured to receive the information from the plurality of sensors and adjust the temperature of the heating and cooling device until the IR signature of the heating and cooling device and the IR signature of the background environment are at least substantially matched in a selectable sub-region of the IR spectrum.

In another embodiment, a control circuit is disclosed. The control circuit comprises a plurality of sensors and a controller operatively coupled to the plurality of sensors. Each sensor of the plurality is operatively associated with detecting IR emissions from one of a heating and cooling device and a background environment. The controller is configured to selectively operate between a plurality of sub-regions of the IR spectrum and adjust a temperature of the heating and cooling device until the IR emissions of the heating and cooling device at least substantially matches the IR emissions of the background environment within a selected sub-region of the IR spectrum.

In yet another embodiment a method for concealing an object from detection in the IR spectrum is disclosed. The method comprises detecting an IR signature of a background environment, detecting an IR signature of a heating and cooling device, and matching the IR signature of the heating and cooling device and the IR signature of the background object within a sub-region of the IR spectrum selectable by a controller from a plurality of different sub-regions of the IR spectrum.

BRIEF DESCRIPTION OF THE SEVERAL VIEWS OF THE DRAWINGS

While the specification concludes with claims particularly pointing out and distinctly claiming what are regarded as embodiments of the invention, advantages of the invention can be more readily ascertained from the following detailed description of some embodiments the invention, when read in conjunction with the accompanying drawings in which:

DETAILED DESCRIPTION

Figure 1A:
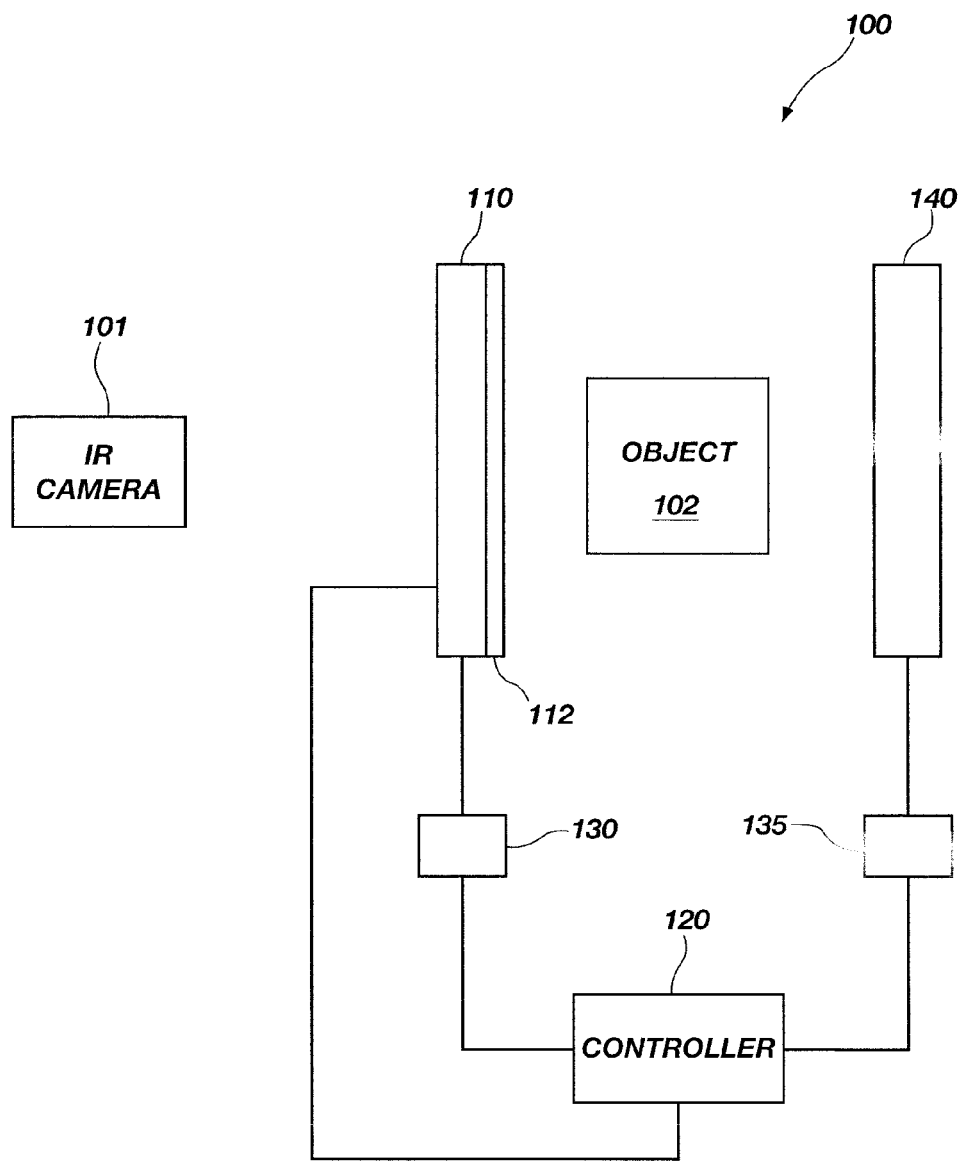
FIGS. 1A, 1B, 1C, and 1D are schematic block diagrams of IR signature matching systems according to embodiments of the present disclosure.

In the following detailed description, reference is made to the accompanying drawings that form a part hereof and, in which is shown by way of illustration, specific embodiments in which the invention may be practiced. These embodiments are described in sufficient detail to enable those of ordinary skill in the art to practice the invention. It is to be understood that other embodiments may be utilized, and that structural, logical, and electrical changes may be made within the scope of the disclosure.

In this description, specific implementations shown and described are only examples and should not be construed as the only way to implement the present invention unless specified otherwise herein. It will be readily apparent to one of ordinary skill in the art that the various embodiments of the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

Referring in general to the following description and accompanying drawings, various embodiments of the present invention are illustrated to show its structure and method of operation. Common elements of the illustrated embodiments may be designated with similar reference numerals. It should be understood that the figures presented are not meant to be illustrative of actual views of any particular portion of an actual structure or method, but are merely idealized representations employed to more clearly and fully depict the present invention defined by the claims below.

It should be appreciated and understood that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

It should be further appreciated and understood that the various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and steps are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the invention described herein.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. A reference to first and second elements does not mean that only two elements may be employed there or that the first element must precede the second element in some manner. Also, unless stated otherwise a set of elements may comprise one or more elements.

The IR spectrum may include wavelengths between approximately 0.7 micrometer and 300 micrometers (i.e., microns). The IR spectrum may be subdivided into smaller sub-regions. For, example, the Near Infrared (NIR) sub-region may include electromagnetic emissions with wavelengths from approximately 0.75 micron to 1.4 microns. The Short-Wavelength Infrared (SWIR) sub-region may include electromagnetic emissions with wavelengths from approximately 1.4 microns to 3 microns. The Mid-Wavelength Infrared (MWIR) sub-region may include electromagnetic emissions with wavelengths from approximately 3 microns to 8 microns. The Long-Wavelength Infrared (LWIR) sub-region may include electromagnetic emissions with wavelengths from approximately 8 microns to 15 microns. The Far Infrared (FIR) sub-region may include electromagnetic emissions with wavelengths in the IR spectrum that are greater than approximately 15 microns. Of course, these descriptions are not to be viewed as limitations, and sub-regions may include other wavelength boundaries that may be used to sub-divide and categorize the IR spectrum. For example, the MWIR sub-region may include electromagnetic emissions with wavelengths that range from approximately 3 microns to 5 microns, and the LWIR sub-region may include electromagnetic emissions with wavelengths that range from approximately 8 microns to 12 microns. In general, IR emissions have longer wavelengths than those of the visible spectrum, and therefore may be transparent to the naked eye. However, IR sensors may be configured to detect IR emissions and "see" objects' electromagnetic emissions within the IR spectrum, which may be desirable when visible light may be insufficient to see (e.g., at night).

Embodiments of the present disclosure include a system, a control circuit, and a method for dynamically matching (i.e., in real-time) an IR signature of an object with an IR signature of the background environment of the object. The IR signature may be determined from IR emissions of an object. The IR signature of an object includes electromagnetic radiation characteristics (e.g., intensity) that are at least partially dependent upon the surface temperature of an object as well as on the emissivity of the object. The emissivity of the object may be a property of the material of the object itself, and may be dependent upon the wavelength of the IR emissions. In other words, an object or material may have an emissivity for IR emissions at a first wavelength and another emissivity for IR emissions at a second wavelength. As a result, IR signatures may be matched for one sub-region of the IR spectrum while not being matched in another sub-region of the IR spectrum. If IR imaging equipment is monitoring the area, the object may be detectable if matched to the wrong fixed band of the IR spectrum.

Embodiments of the present disclosure include a controller that is configured to selectively operate between a plurality of sub-regions of the IR spectrum and adjust a temperature of the object until the IR signature of the heating and cooling device at least substantially matches the IR signature of the background environment within a selected sub-region of the IR spectrum. As an example, the controller may match IR signatures in a first sub-region of the IR spectrum (e.g., MWIR), and may selectively be switched to match IR signatures in a second sub-region of the IR spectrum (e.g., LWIR). Thus, an operator may be free to operate the controller to match to a desired sub-region depending on the IR spectrum range that the operator believes an external IR imaging equipment to be monitoring for a given area.

FIGS. 1A, 1B, 1C, and 1D are schematic block diagrams of IR signature matching systems 100, 150, 160, 170 according to embodiments of the present disclosure. In particular, each of the IR signature matching systems 100, 150, 160, 170 include a heating and cooling device 110, a controller 120, and a plurality of sensors 130, 135. The heating and cooling device 110 may optionally be coupled to a heat management system 112.

An object 102 may be a land vehicle, a water vehicle, an aircraft, a building, a person, or any other object of which it would be desirable to substantially match its IR signature with the IR signature of a background environment 140 and, thus, mask object 102 from detection by IR imaging equipment (e.g., IR camera 101). The object 102 may be also be a portion of a larger object, such as a panel of a vehicle, a panel attached to a roof or exterior wall of a building, etc. The object 102 may be stationary or mobile and may be permanent or temporary structures. The background environment 140 may be an object (e.g., building, tree, ground, structure, etc.), a material mass, wall, panel, film or fabric, or may generally be the ambient background (e.g., air, foliage) surrounding the object 102.

Figure 1B:
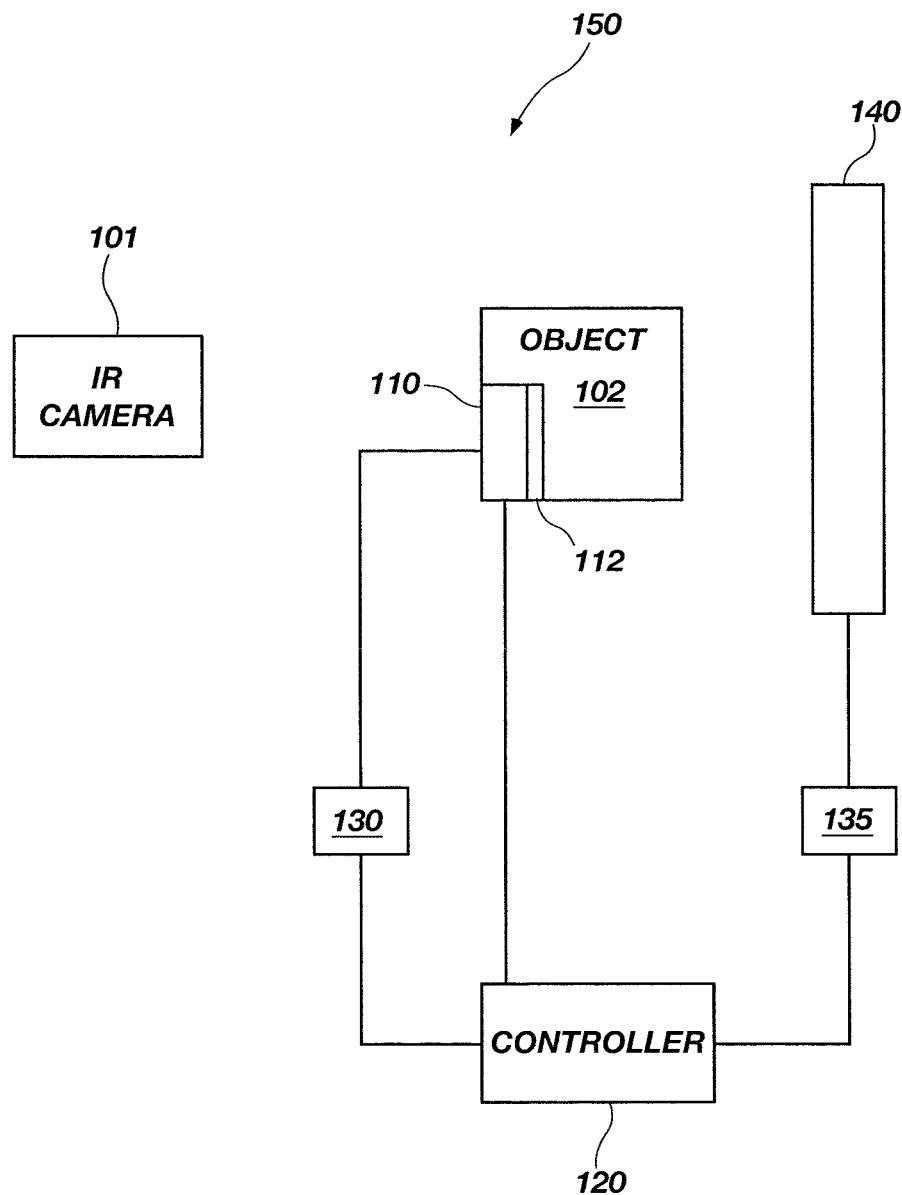
Figure 1C:
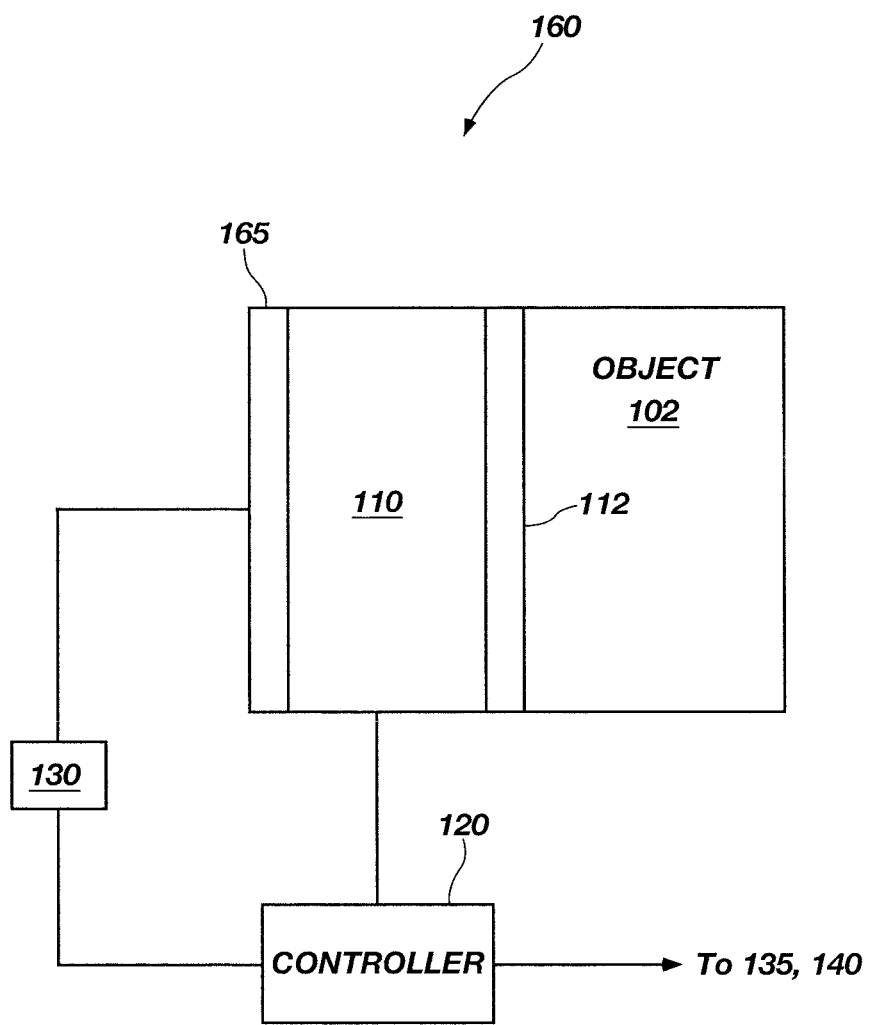
Figure 1D:
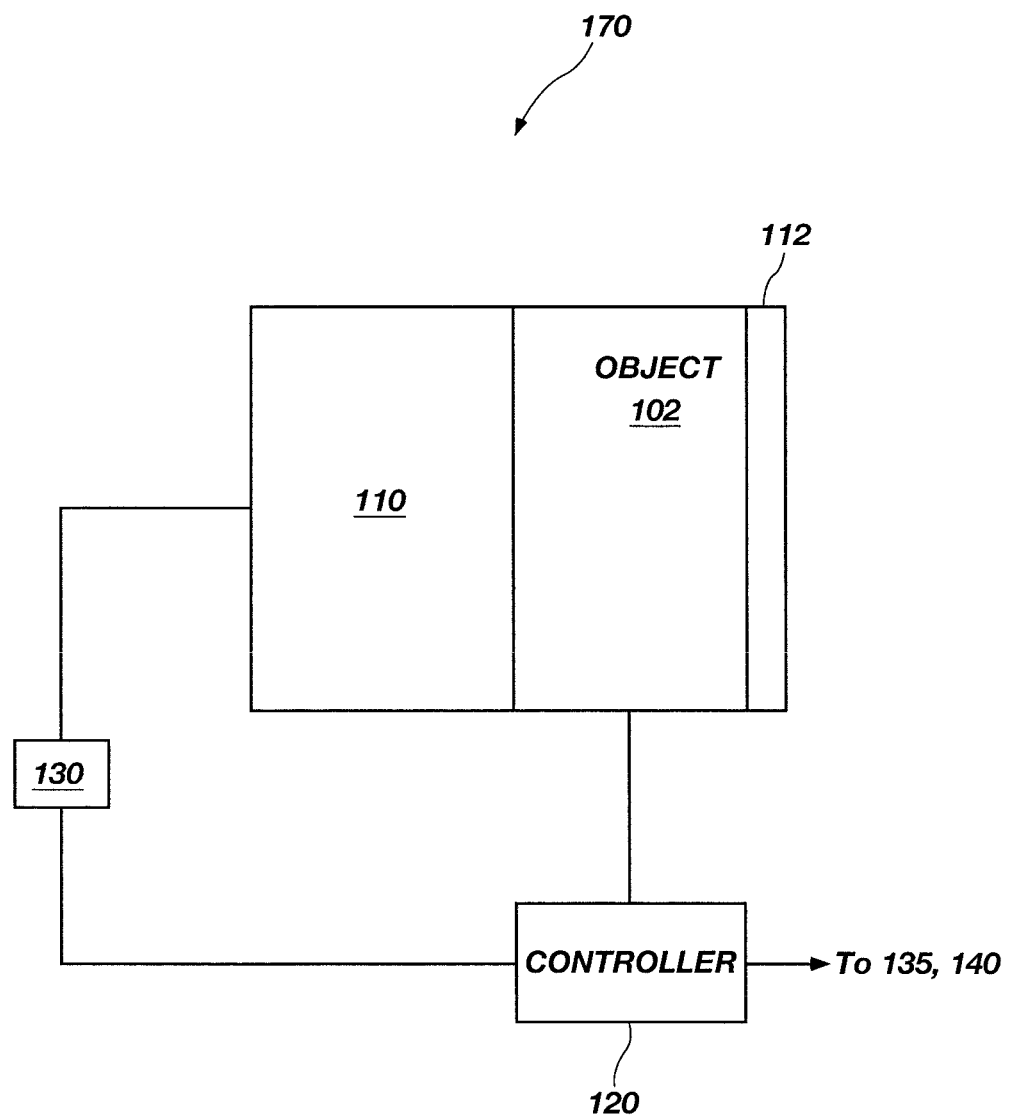

As shown in FIG. 1A, the heating and cooling device 110 may be positioned such that the object 102 (e.g., an object of interest, target of interest, etc.) is located between the background environment 140 and the heating and cooling device 110. As shown in FIGS. 1B, 1C, and 1D, the heating and cooling device 110 may be integrally formed with, or attached to, at least a portion of the object 102 itself. For example, in FIG. 1B, the heating and cooling device 110 is shown to be integrally formed with a portion of the object 102. For example, the heating and cooling device 110 may be configured as a modular panel of a larger object 102 (e.g., vehicle) in order to mask the IR signature of a component (e.g., engine) of the larger object 102 that may likely be detected by the IR camera 101. In FIG. 1C, the heating and cooling device 110 is shown to further be coupled to another material 165 (e.g., plastic or metal panel), such that the heating and cooling device 110 adjusts the temperature of the another material 165 rather than only the heating and cooling device 110 itself. In FIG. 1D, the heating and cooling device 110 is shown to attach to the object 102 itself such that the heating and cooling device 110 adjusts the temperature of the object 102. Of course, an IR signature matching system may incorporate combinations of the different embodiments of FIGS. 1A-1D.

It is recognized that when the heating and cooling device 110 is attached to a different material, such as the object 102 or the another material 165, the IR signature that is used to match with the IR signature of the background environment 140 may depend on the outermost material (e.g., object 102, or the another material 165) that is detected by the first sensor 130 rather than the IR signature of the heating and cooling device 110 itself. Nevertheless, for purposes of this description, including in the claims, the IR signature of the heating and cooling device 110 will be referred to for simplicity. Therefore, unless otherwise specified herein, any reference to the IR signature, IR emissions, emissivity, or other related terms of the heating and cooling device 110 is to be interpreted as being associated with the outermost surface that is viewed by the IR camera 101, regardless of whether that surface is actually the heating and cooling device 110 (e.g., object 102, another material 165, etc.), and that such an IR signature may be what the controller 120 uses to match with the IR signature of the background environment 140. Matching the IR signature of the heating and cooling device 110 with the IR signature of the background environment 140 may result in the object 102 being cloaked by an IR camera 101.

The plurality of sensors 130, 135 are configured to detect electromagnetic emissions in the IR spectrum and transmit information related to the IR signature of a desired object to the controller 120. The plurality of sensors 130, 135 may individually be referred to as a first sensor 130 and a second sensor 135 that are indicated to be operatively associated with different locations. For example, the first sensor 130 may be operatively associated with the heating and cooling device 110 and detect and transmit data related to the IR signature of the heating and cooling device 110 to the controller 120. The second sensor 135 may be operatively associated with the background environment 140 and detect and transmit data related to the IR signature of the background environment 140 to the controller 120. The plurality of sensors 130, 135 may be configured as IR sensors that may view the associated object 102 and background environment 140 and detect the intensity of the IR emissions thereof over a wavelength range. The intensity of the IR emissions detected by the plurality of sensors 130, 135 may include the IR signature of the associated objects. The first sensor 130 may be positioned in proximity to the heating and cooling device 110 such that the field of view of the first sensor 130 may be directed to the heating and cooling device 110. The second sensor 135 may be positioned (e.g., at an elevated location from the first sensor 130) such that the field of view of the second sensor 135 is directed to the background environment 140.

The indication of a first sensor 130 and a second sensor 135 is not intended to limit the sensors to a particular number. In other words, the first sensor 130 and the second sensor 135 may each include their own plurality of sensors, such as sensors that are configured for operation in different sub-regions of the IR spectrum. For example, the first sensor 130 may be operatively associated with the heating and cooling device 110 and configured to detect the IR signature of the heating and cooling device 110 in a first sub-region of the IR spectrum. A third sensor (not explicitly shown) may also be operatively associated with the heating and cooling device and configured to detect the IR signature of the heating and cooling device 110 in a second sub-region of the IR spectrum. Likewise, the second sensor 135 may be operatively associated with the background and configured to detect the IR signature of the background in the first sub-region of the IR spectrum, and a fourth sensor (not explicitly shown) may also be operatively associated with the background and configured to detect the IR signature of the background in the second sub-region of the IR spectrum. More sensors may be included that may further divide the IR spectrum into different sub-regions.

The controller 120 is configured to receive the signals from the plurality of sensors 130, 135 that are indicative of the IR signatures of the heating and cooling device 110 and the background environment 140. The controller 120 may be a general processor or another programmable device that may be specifically used as a controller, such as a proportional integral derivative controller (PID). Communication between the plurality of sensors 130, 135 and the controller 120 may be through wired, wireless, or other similar connections. The controller 120 may receive such signals from each of the plurality of sensors 130, 135 at least substantially simultaneously. The controller 120 may be further configured to determine (e.g., by comparing the relative voltages of the signals) the IR signature mismatch between the heating and cooling device 110 and the background environment 140. In response, the controller 120 may be configured to proportionately control the electrical current flowing through the heating and cooling device 110 to adjust the surface temperature of the heating and cooling device 110 until the IR signature of the heating and cooling device 110 at least substantially matches the IR signature of the background environment 140 in a selectable sub-region of the IR spectrum.

As the controller 120 may selectively match the IR signatures within a plurality of different sub-regions of the IR spectrum, the controller 120 may be provided with intelligence (e.g., from an operator) regarding what kind of threat is likely for the specific area where the IR signature matching system is being used. For example, an operator may indicate to the controller 120 which sub-region of the IR signature is to be matched. In response, the controller 120 may know which of the plurality of sensors 130, 135 provides data for each sub-region of the IR spectrum, and then a user can have the controller 120 switch on the fly depending on the user knowing the threat for that area.

The heating and cooling device 110 may be configured to adjust its temperature (e.g., heat or cool) in response to the signal received from the controller 120 in order to dynamically match the IR signature of the heating and cooling device 110 with the background environment 140. The heating and cooling device 110 may be a thermoelectric heater/cooler (TEHC), such as a Peltier device that uses the Peltier effect to adjust the temperature of an object. Such a TEHC may be, for example, available from Tellurex Corporation of Traverse City, Mich.

The heating and cooling device 110 may be configured as, or attached to, a modular panel to mask the IR signatures generated by objects (e.g., an engine, tires, etc.) related to land vehicles, marine vehicles, and aircraft. In other words, the heating and cooling device 110 may be integrally formed with a material or object which serves as a modular panel, or the heating and cooling device 110 may be separate from the modular panel, and may simply contact such a modular panel to adjust the temperature of the modular panel. A modular panel for a vehicle or other object is intended as an example, and other configurations, shapes, shapes, and objects are also contemplated. For example, in some embodiments the heating and cooling device 110 may be configured as a flexible film that may be employed to mask the IR signature of a person (e.g., dismounted personnel) by adjusting the external temperature of the flexible film to match the IR signature of the flexible film with the IR signature of the ground in the immediate vicinity of the person.

Because the IR signature (i.e., accounting for thermal information and emissivity) of the heating and cooling device 110 is used to match with the IR signature of the background environment 140, the actual temperature of the heating and cooling device 110 and the background environment 140 may be different when the IR signatures are matched. Therefore, the IR signature matching system 100 may compensate for the emissivity of the materials of both the heating and cooling device (or the outer material attached to the heating and cooling device 110) and the background environment 140. In addition, the IR signatures may be matched at different temperatures for the different sub-regions of the IR spectrum.

The heat management system 112 may be configured to dissipate heat that builds up on the heating and cooling device 110. For example, when the heating and cooling device 110 cools a surface, the other side of the surface heats up. The heat management system 112 may be configured as an active heat sink (e.g., includes a fan) or a passive heat sink according to methods of conducting, dissipating, and/or transferring heat from one source to location as are known in the art.

In operation, the first sensor 130 transmits the IR signature of the heating and cooling device 110 to the controller 120. The second sensor 135 transmits the IR signature of the background environment 140 to the controller 120. The plurality of sensors 130, 135 detect the intensities of the IR emissions generated by the associated heating and cooling device 110 and the background environment 140. The signals generated by the plurality of sensors 130, 135 may have voltages that are proportional to the intensity of the IR emissions. For example, if the controller 120 determines that the signal from the first sensor 130 is relatively greater than the voltage from the second sensor 135, the controller 120 interprets that relatively higher voltage as a brighter intensity from the IR signature, and therefore, that the relative temperature on the heating and cooling device 110 needs to be cooled. The controller 120 transmits the appropriate signal to cool the temperature of the heating and cooling device 110 until the controller 120 determines that the IR signatures of the heating and cooling device 110 and the background environment 140 are substantially matched, at least sufficiently close within a predetermined tolerance level. Of course, if the controller 120 determines that the signal from the second sensor 135 is relatively greater than the voltage from the first sensor 130, the controller interprets that relatively higher voltage as the relative temperature of the heating and cooling device needing to be heated. The controller 120 transmits the appropriate signal to heat the temperature of the heating and cooling device 110 until the controller 120 determines that the IR signatures of the heating and cooling device 110 and the background environment 140 are matched, or at least sufficiently close within a predetermined tolerance level. In other words, the controller 120 is configured to adjust the temperature of the heating and cooling device 110 such that the adjusted IR signature of the heating and cooling device 110 at least substantially matches the IR signature of the background environment 140. As a result, the object 102 may be effectively masked from detection from the IR camera 101.

As previously described, the plurality of sensors 130, 135 may be IR sensors that are configured to generate data related to the IR signatures of the heating and cooling device 110 and the background environment 140. The data transmitted by an IR sensor may be interpreted by the controller as an intensity that represents the IR signature, and such an intensity may be based at least in part on both temperature and emissivity. In some embodiments, the one or more of the plurality of sensors 130, 135 may be a thermocouple that is configured to make contact with the object in order to generate a signal indicative of the temperature of the object. To adjust for the emissivity, the controller 120 may have information related to the heating and cooling device (or the material attached to the heating and cooling device 110) and the background environment 140 such that the emissivity for these materials may be known. As the emissivity may be wavelength dependent, the emissivity of the different materials may be known by the controller 120 for the different sub-regions of the IR spectrum such that the controller 120 may selectively adjust the IR signature within the desired sub-region of the IR spectrum.

Figure 2:
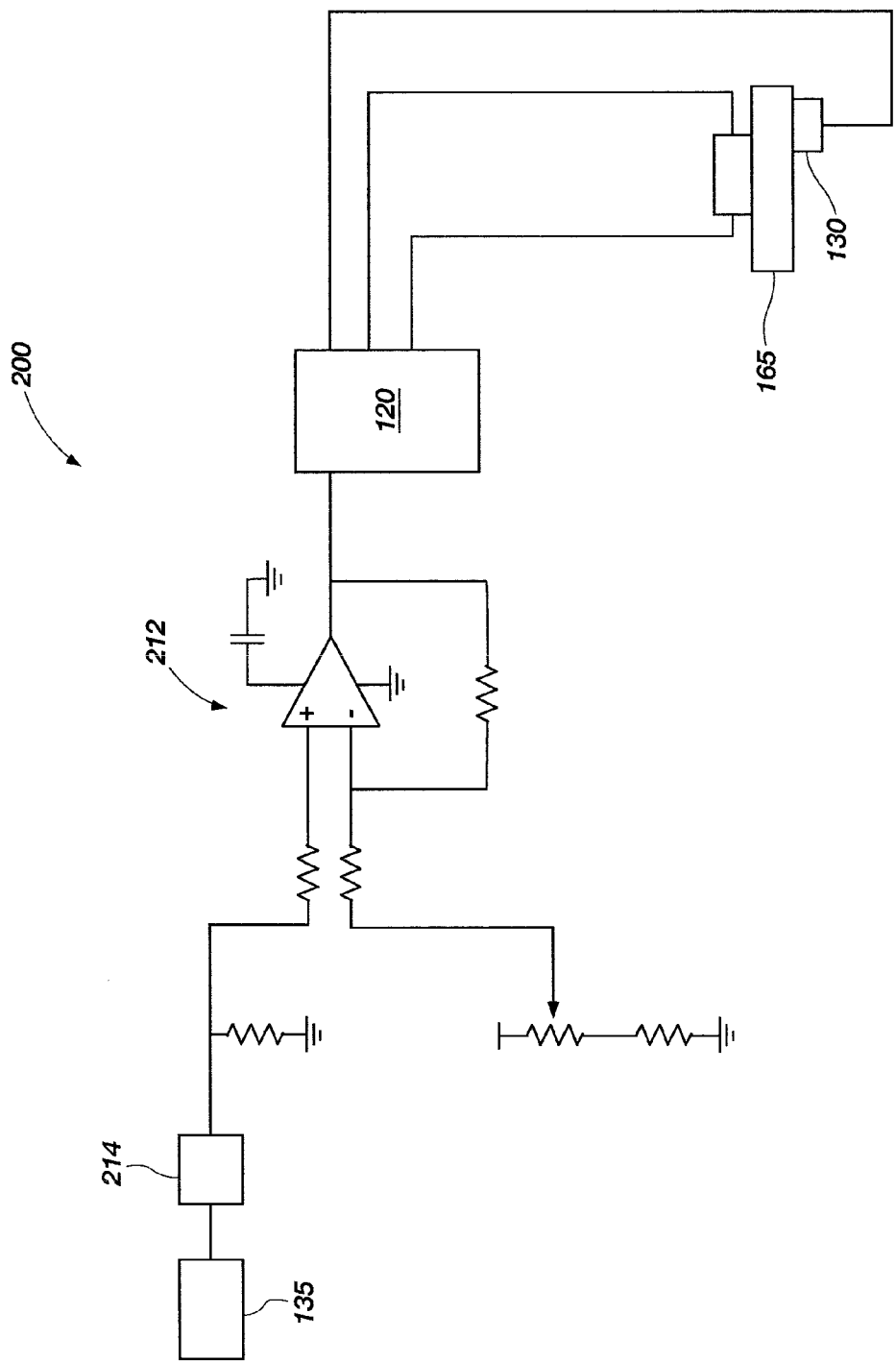
FIG. 2 is a schematic diagram of a control circuit according to an embodiment of the present disclosure.

FIG. 2 is a schematic diagram of a control circuit 200 according to an embodiment of the present disclosure. The control circuit 200 includes heating and cooling device 110, controller 120, and plurality of sensors 130, 135 that are configured as previously discussed with regard to the IR matching systems 100, 150, 160, 170 of FIGS. 1A, 1B, 1C, 1D. In particular, the first sensor 130 may be associated with the heating and cooling device 110 and coupled to the controller 120. The second sensor 135 may be associated with background environment 140 (not shown in FIG. 2), and coupled with the controller 120. The heating and cooling device 110 may be placed in front of, attached to, or formed with, at least a portion of an object 102 that is to be hidden from detection of an IR camera 101 (not shown in FIG. 2) as described with respect to the embodiments of FIGS. 1A-1D.

In operation, the first sensor 130 and the second sensor 135 detect IR emissions and transmit data related to the IR signature of the heating and cooling device 110 and the background environment 140 to the controller 120. For example, the plurality of sensors 130, 135 may be configured as IR sensors that detect and transmit data representing intensity of the IR emissions, and thus the IR signatures. In some embodiments, one or more of the plurality of sensors 130, 135 may be configured as thermocouples that transmit temperature data to the controller 120, and the controller 120 may include emissivity data regarding the materials of the heating and cooling device 110 and the background environment 140, in order to compensate for the emissivity when matching the IR signatures of the heating and cooling device 110 and the background environment 140. As previously discussed, the emissivity of a material may vary at different wavelengths. As a result, stored emissivity data may be known for the materials of the heating and cooling device 110 and the background environment 140 for different sub-regions of the IR spectrum such that the controller 120 may combine the known emissivity for the particular materials for the desired sub-region of the IR spectrum with the temperature data when the controller 120 is selected to operate for the desired sub-region of the IR spectrum.

When the controller 120 receives the signals from the plurality of sensors 130, 135, the controller 120 compares the signals representing the IR signature, and transmits a temperature adjustment signal to the heating and cooling device 110. The controller 120 continues to receive the signals from the plurality of sensors 130, 135 and continues to adjust the temperature of the heating and cooling device 110 until the IR signatures of the heating and cooling device 110 and the background environment 140 are at least substantially matched.

The configuration of the control circuit 200 of FIG. 2 is shown to be an open loop control, in that the plurality of sensors 130, 135 transmit the signals to the controller 120 without an active feedback path. In order to remove bias on the system, the control circuit 200 may include a differential amplifier 212 to subtract off the bias between the signals from one of the plurality of sensors 130, 135. If the bias exists on the heating and cooling device 110, the differential amplifier 212 may be located in the path between the first sensor 130 (associated with the background environment 140) and the controller 120. The differential amplifier 212 is configured to subtract the difference between two signals, and the voltage at the input of the differential amplifier 212 may be determined by the values of the resistors chosen in order to be at least substantially similar to the bias on the system and match the zero points of the two signals. By removing the bias and matching the zero points, the slopes of the signals may be at least substantially the same.

Figure 3:
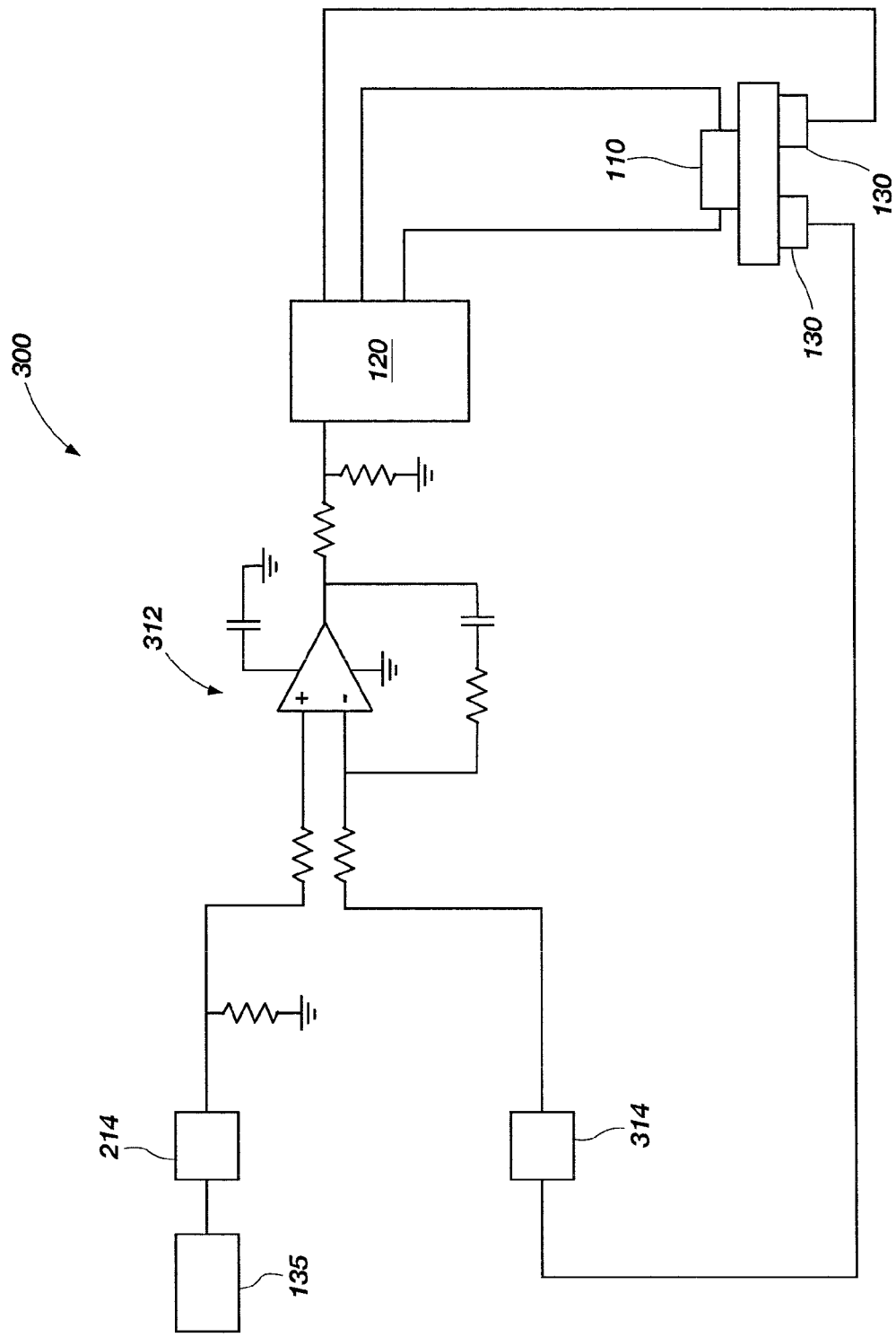
FIG. 3 is a schematic diagram of a control circuit according to an embodiment of the present disclosure.

FIG. 3 is a schematic diagram of a control circuit 300 according to an embodiment of the present disclosure. The control circuit 300 includes heating and cooling device 110, controller 120, and plurality of sensors 130, 135 that are configured as previously discussed with regard to the IR matching systems 100, 150, 160, 170 of FIGS. 1A, 1B, 1C, 1D. In particular, the first sensor 130 may be associated with the heating and cooling device 110 and coupled to the controller 120. The second sensor 135 may be associated with background environment 140, and coupled with the controller 120. In contrast with the control circuit 200 of FIG. 2, the control circuit 300 of FIG. 3 couples the first sensor 130 to the controller 130 through amplifier 312. The control circuit 300 may further include a third sensor 330 coupled to the controller 130. Transmitters 214, 314 may be coupled with the plurality of sensors 130, 135 to buffer and/or amplify the signals prior to being input into the amplifier 312. The heating and cooling device 110 may be placed in front of, attached to, or formed with, at least a portion of an object 102 (not shown in FIG. 3) that is to be hidden from view of an IR camera 101 (not shown in FIG. 3) as described with respect to the embodiments of FIGS. 1A-1D.

The configuration of the control circuit 200 of FIG. 2 is shown to be a closed loop control, in that the plurality of sensors 130, 135 transmit the signals to the controller 120 with an active feedback path. The third sensor 330 provides a closed feedback loop between the controller 120 and the heating and cooling device 110. The first sensor 130 provides a closed feedback loop along with the second sensor 135. The amplifier 312 is configured to provide negative feedback and generates a voltage signal to the controller 120, which adjusts the temperature of the heating and cooling device 110 in order to make the inputs to the amplifier 312 equal. As a result, the IR signatures of the heating and cooling device 110 and the background environment 140 (FIGS. 1A-1D) may be substantially equal. The controller 120 may be configured to selectively operate the plurality of sensors 130, 135 between different sub-regions of the IR spectrum.

Figure 4:
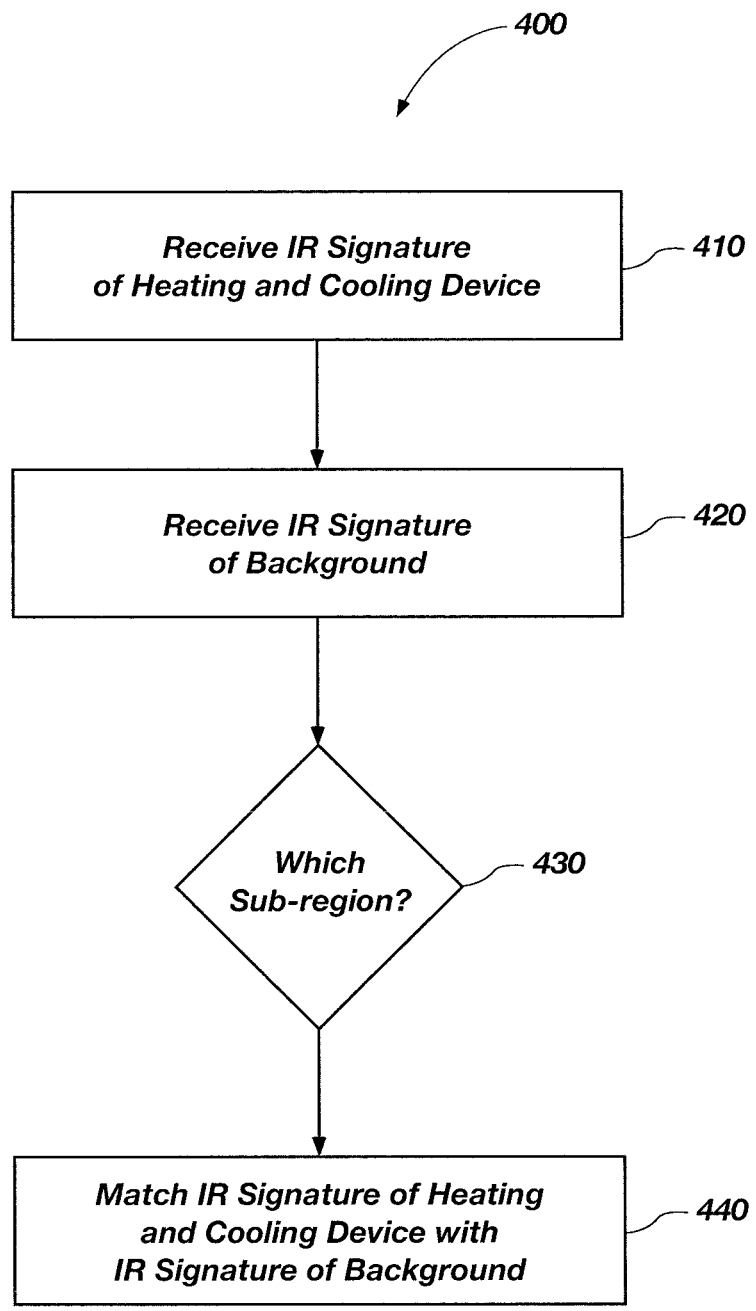
FIG. 4 is a flow chart illustrating a method for matching IR signatures of a heating and cooling device and a background environment according to an embodiment of the present disclosure.

FIG. 4 is a flow chart 400 illustrating a method for matching IR signatures of a heating and cooling device and a background object serving as the background environment according to an embodiment of the present disclosure. At operation 410, data representing the IR signature of the heating and cooling device is received by the controller. At operation 420, data representing the IR signatures of the background is received by the controller. The data received during operations 410 and 420 may be received at least substantially simultaneously, such as in real-time. The data may be a voltage output from sensors, which voltage may take into account the temperature as well as the emissivity of the materials at the surface of the heating and cooling device and the background object. Such temperature and emissivity may be detected by sensing the intensity of the IR emissions of the heating and cooling device and the background object with an IR sensor. A plurality of IR sensors may be used to obtain data for a plurality of different sub-regions of the IR spectrum. In some embodiments, the temperature data may be detected by a temperature sensor (e.g., thermocouple) and combined with known emissivity data for the materials for the plurality of different sub-regions of the IR spectrum, which known emissivity data may be stored within the controller.

At operation 430, the controller may determine which of the sub-regions of the IR spectrum to operate within. The sub-region may be determined by intelligence provided by a user as to the potential threat of the IR imaging equipment monitoring the area. At operation 440, the controller matches the IR signature of the heating and cooling device and the IR signature of the background object within the sub-region of the IR spectrum that was selected by the controller. Matching the IR signature may include adjusting the temperature of the heating and cooling device in response to a detected difference in IR signatures of the heating and cooling device and the background object.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the scope of the invention as defined by the following appended claims and their legal equivalents. For example, elements and features disclosed in relation to one embodiment may be combined with elements and features disclosed in relation to other embodiments of the present invention.

What is claimed is:

1. An infrared (IR) signature matching system, comprising:
   a vehicle heating and cooling device;
   a plurality of sensors configured to detect information related to an IR signature of the vehicle heating and cooling device and an IR signature of a background environment; and
   a controller operably coupled with the vehicle heating and cooling device and the plurality of sensors, wherein the controller is configured to receive the information from the plurality of sensors and adjust the temperature of the vehicle heating and cooling device until the IR signature of the vehicle heating and cooling device and the IR signature of the background environment are at least substantially matched in a selectable sub-region of the IR spectrum.

2. The IR signature matching system of claim 1, wherein the plurality of sensors include:
   a first sensor operatively associated with the vehicle heating and cooling device and configured to detect the IR signature of the vehicle heating and cooling device in a first sub-region of the IR spectrum;
   a second sensor operatively associated with the background environment and configured to detect the IR signature of the background environment in the first sub-region of the IR spectrum;
   a third sensor operatively associated with the vehicle heating and cooling device and configured to detect the IR signature of the vehicle heating and cooling device in a second sub-region of the IR spectrum; and
   a fourth sensor operatively associated with the background environment and configured to detect the IR signature of the background environment in the second sub-region of the IR spectrum.

3. The IR signature matching system of claim 2, wherein one of the first sub-region and the second sub-region is a mid-wavelength infrared region of the IR spectrum.

4. The IR signature matching system of claim 2, wherein one of the first sub-region and the second sub-region is a long-wavelength infrared region of the IR spectrum.

5. The IR signature matching system of claim 2, wherein one of the first sub-region and the second sub-region includes an IR emission wavelength range of approximately 3 microns and 5 microns.

6. The IR signature matching system of claim 2, wherein one of the first sub-region and the second sub-region includes an IR emission wavelength range of approximately 8 microns and 12 microns.

7. The IR signature matching system of claim 1, wherein the vehicle heating and cooling device is coupled with a modular panel of a vehicle.

8. The IR signature matching system of claim 7, wherein the vehicle is selected from the group consisting of a land vehicle, marine vehicle, and aircraft.

9. The IR signature matching system of claim 1, wherein the background environment is a stationary mass, structure, material, or foliage in the background with respect to the vehicle heating and cooling device.

10. The IR signature matching system of claim 1, wherein the background environment comprises an object and the vehicle heating and cooling device is attached to the object.

11. A control circuit, comprising:
    a plurality of sensors, wherein each sensor of the plurality is operatively associated with detecting infrared (IR) emissions from one of a vehicle heating and cooling device and a background environment; and
    a controller operatively coupled to the plurality of sensors, wherein the controller is configured to selectively operate between a plurality of sub-regions of the IR spectrum and adjust a temperature of the vehicle heating and cooling device until the IR emissions of the vehicle heating and cooling device at least substantially matches the IR emissions of the background environment within a selected sub-region of the IR spectrum.

12. The control circuit of claim 11, wherein the control circuit is configured as an open loop circuit, wherein a first sensor of the plurality and a second sensor of the plurality are coupled in separate forward paths to the controller.

13. The control circuit of claim 12, further comprising a differential amplifier operatively coupled to the controller and configured to remove system bias from one of the first sensor and the second sensor.

14. The control circuit of claim 11, wherein the control circuit is configured as an active feedback circuit, wherein at least one of a first sensor and a second sensor transmit signals to the controller through an active feedback path to an amplifier.

15. The control circuit of claim 11, wherein each of the plurality of sensors include another plurality of sensors configured to operate within a plurality of different sub-regions of the IR spectrum.

16. A method for concealing an object from detection in the infrared (IR) spectrum, the method comprising:
    detecting an IR signature of a background environment;
    detecting an IR signature of a vehicle heating and cooling device; and
    matching the IR signature of the vehicle heating and cooling device and the IR signature of the background environment within a sub-region of the IR spectrum selectable by a controller from a plurality of different sub-regions of the IR spectrum.

17. The method of claim 16, wherein matching the IR signatures includes adjusting the temperature of the vehicle heating and cooling device in response to a detected difference in IR signatures of the vehicle heating and cooling device and the background environment.

18. The method of claim 16, wherein detecting the IR signatures of the background environment and the vehicle heating and cooling device includes detecting surface temperatures from the vehicle heating and cooling device and the background environment and combining the surface temperatures with known emissivity data for the vehicle heating and cooling device and the background environment in a selected sub-region of the IR spectrum.

19. The method of claim 16, wherein detecting the IR signatures of the background environment and the vehicle heating and cooling device includes detecting IR intensity from the IR emissions of the vehicle heating and cooling device and the background environment for a selected sub-region of the IR spectrum.

20. The method of claim 16, wherein the plurality of sub-regions of the IR spectrum include a mid-wavelength IR region and a long-wavelength IR region.

\* \* \* \* \*